Figure 1:
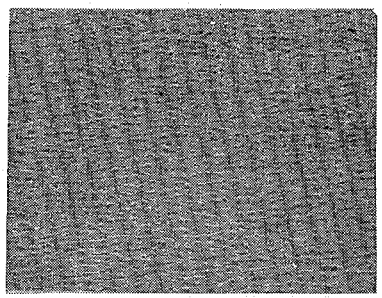

March 14, 1967 HIROSUKE YUMOTO ETAL 3,309,452
THERMOPLASTIC FILM AND ITS PROCESS OF MANUFACTURE
Filed Sept. 3, 1963 3 Sheets-Sheet 1

INVENTORS
HIROSUKE YUMOTO,
KAZUYA HARADA,
MASAAKI ITOGA,
KOICHI KATO

BY Stevens, Davis, Miller & Mosher
ATTORNEYS

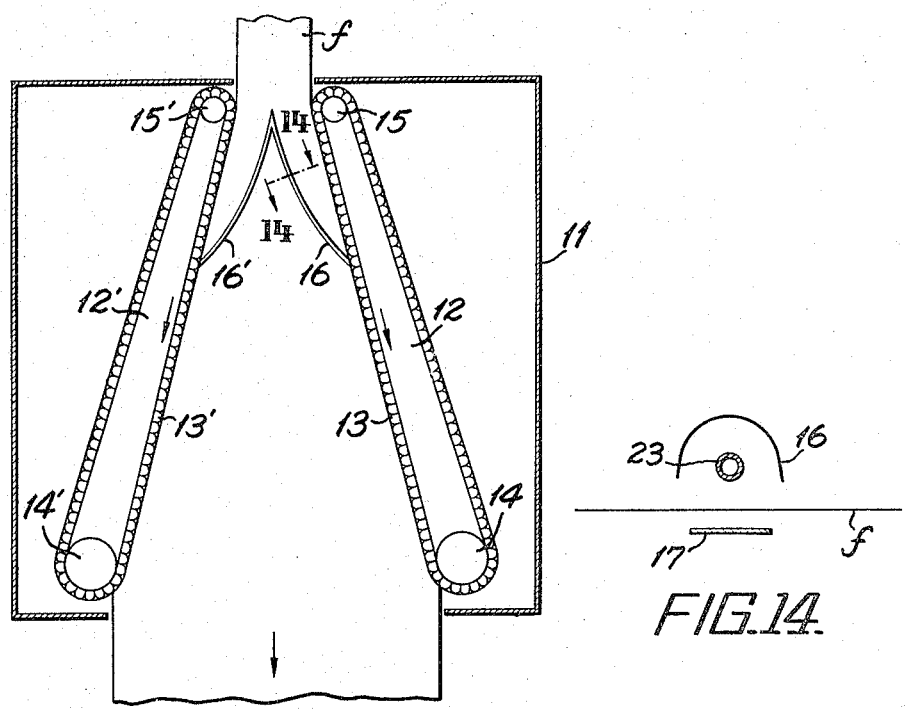
FIG.12.
FIG.14.
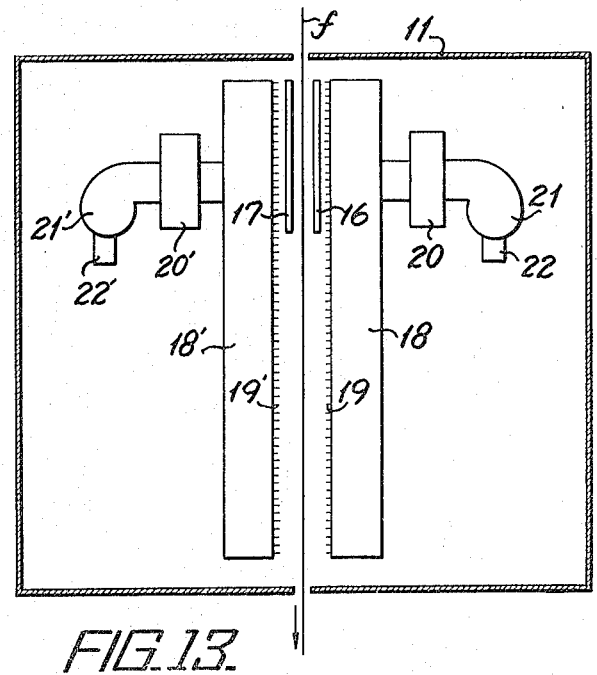
FIG.13.

United States Patent Office 3,309,452
Patented Mar. 14, 1967

3,309,452
THERMOPLASTIC FILM AND ITS PROCESS
OF MANUFACTURE
Hirosuke Yumoto, Kazuya Harada, and Masaaki Itoga, Shizuoka-ken, and Koichi Kato, Shiga-ken, Japan, assignors to Toyo Rayon Kabushiki Kaisha, Tokyo, Japan, a corporation of Japan
Filed Sept. 3, 1963, Ser. No. 306,387
Claims priority, application Japan, Sept. 11, 1962, 37/38,990
5 Claims. (Cl. 264—284)

This invention relates to improvements in thermoplastic film and its process of manufacture characterized in that thermoplastic film obtained by the process of manufacture of this invention will have a surface structure specifically featured with webbed designs appearing on the surface thereof having over 0.03 micron or preferably over 0.1 micron surface roughness, said surface structure being different in quality from the interior structure and having thickness of under 5 microns or possibly under 1 micron.

A variety of techniques have been attempted and developed in the manufacture of thermoplastic film in order to secure an extremely smooth surface for the film. Normally the film which had been manufactured by the hitherto known methods were too smooth on the surface and often it has caused heavy adhesion or friction between film layers laid next to each other or between the film and the surface of a manufacturing apparatus in case of printing film, fabricating packages by film, joining film layers with each other or in other finishing processes, because such adhesion or friction resulted in the reduction of machinability and antiblocking characteristics with lower efficiency of manufacturing. This disadvantage has been significent especially in the manufacture of electrified thermoplastic resinous film, and particularly in the manufacture of a very thin electrified film where the film manufactured was in almost all cases impossible to separate.

The inventors have heretofore attempted to obtain a desired surface condition for film by overcoming such difficulties and found that said machinability and antiblocking characteristics could be improved effectively by forming certain roughness on the film surface. The following are the methods hitherto known by the public for the improvement of this film surface:

A. Oily agent applied on the surface.
B. Fine powder particles dispersed on the surface.
C. Inert fine powder particles mixed in with molten film material when it is extruded.
D. Low molecular components or other additives deposited by heat treatment.
E. Surface of the film given roughness by pressing.

The methods as mentioned above are all intended to adhere certain components other than polymers on the surface or to mix such components in the interior part and thus obtain desirable roughness on the surface. However, there has not been attempted a method to change the surface structure fundamentally as intended by the present invention.

Among the above methods, it is to be noted that A is intended to utilize lubrication properties of an oily agent, but it is liable to bring a worse effect as it runs away and loses specific properties of the film such as adhesion, printing nature, vacuum metallizing, and insulating characteristics. In B we find that fine powder particles do not adhere evenly on the surface but rather reduce the transparency of the film and the adhered powder particles are liable to fall off the film. In C uniform dispersion of particles in the interior of the film is not possible since the particles cohere together and damage the appearance. D is a particular example in which the agents which are not containing filling material or low molecular weight component are applied. In the process of E, the physical nature of the film material is often subjected to changes by pressing and heating effects at the time of embossing or other similar work, so that the gained product will have an appearance quite different from the desired object when it is manufactured.

The present inventors have intended to impart sufficient smoothness as well as stretching properties simultaneously to the thermoplastic film when the orientation is given to the material. A number of various experiments concerning stretching temperature and other requirements led them to discover a fact that has not been known before. The fact is that if some difference is produced in temperature between the interior part and the surface part of a film, the interior and surface structures of the film will become heterogeneous in quality and if it is oriented within the range of most desirable temperature there will appear a specially featured layer having over 0.03 to 0.1 micron surface roughness with webbed designs.

Figure 2:
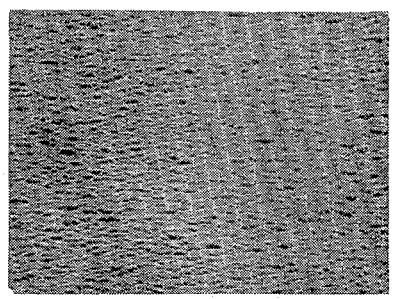
Figure 3:
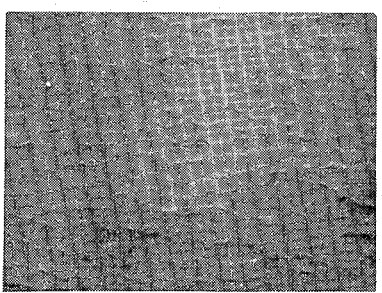
Figure 4:
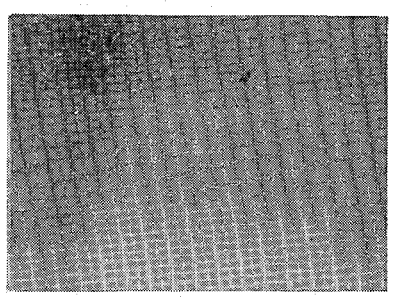
Figure 5:
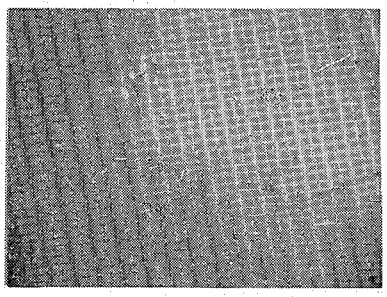
Figure 6:
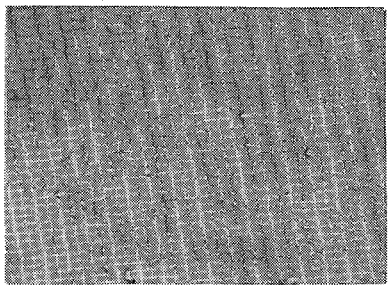
Figure 7:
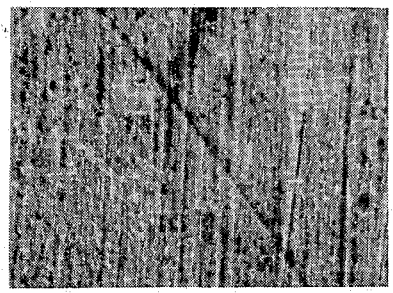
Figure 8:
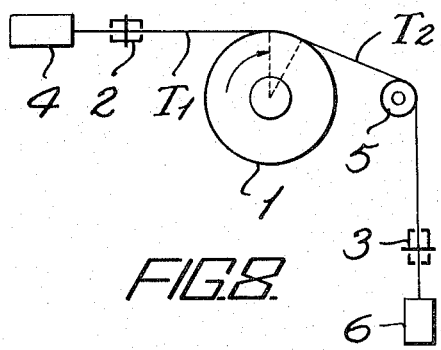
Figure 9:
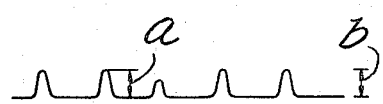
Figure 10:
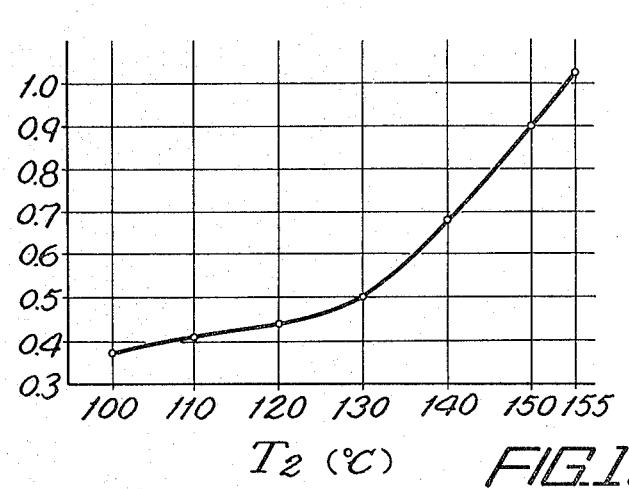
Figure 11:
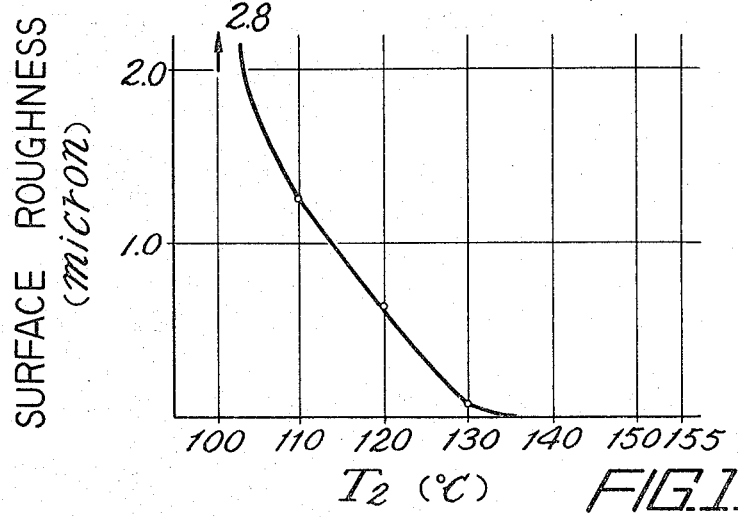

An embodiment of the invention will now be described by way of example with reference to the accompanying drawings wherein:

FIGS. 1 to 3 are microphotographic pictures of the films according to this invention;
FIG. 4 is a picture showing the film surface on the side which is non-oriented and not cooled;
FIG. 5 is a picture of a biaxially oriented film surface;
FIG. 6 is a picture of the film surface observed for obtaining web designs of the film;
FIG. 7 is a picture showing the film surface contacted and cooled by a roller with the upper surface heated and stretched uniaxially;
FIG. 8 is a diagrammatic side view of a measuring apparatus for coefficient of friction;
FIG. 9 is a diagram representing surface roughness of the film;
FIG. 10 is a graph illustrating variation of coefficient of friction;
FIG. 11 is also an illustration showing variation of surface roughness.

This invention can be realized fully and easily by injecting cooled gas on the surface of the film which is heated to a certain orientation temperature just when the film arranged preliminarily in some direction is further oriented in the axial direction or by contacting a cooling gas or liquid or roller with the surface of the film and radiantly heating the film by an infrared ray heater separately prepared for this process. During the process, the film is evenly heated through the whole thickness by radiance of heat while the surface is being cooled. Thereby there is produced a temperature gradient between the interior part and the surface of the film. The gradient of temperature is especially sharp in this case as the thermoplastic film is lower in heat conductivity compared with other materials such as metal.

By this action the interior of the thermoplastic film is kept at a temperature suitable for orientation, but the temperature of a very thin surface layer is kept below the orientation point. If the film having such temperature difference is stretched with the interior part at a proper temperature and the surface layer at a lower temperature, both layers do not stretch equally. There will be produced a discrepancy between the interior and surface layers and this will result in the destruction of the surface layer including cracks, breaks or other heretofore believed undesirable effects.

Microphotographs taken on the surface layer of the film thus treated have shown such conditions as webs or melon rinds.

FIGS. 1 to 4 are microphotographs of a polypropylene film obtained by means of aluminium shadowing. The film was longitudinally oriented preliminarily and thereafter heated to around 155° C. by an infrared ray heater from above and the backside of the film was contacted with an air current of 70° C.

Photographs shown in FIGS. 1 to 3 represent the backside or cooled surface. FIG. 4 is a photograph of the surface facing the infrared ray radiation or the heated side surface. The photographs shown in FIG. 1 and FIG. 2 represent web designs appearing most significantly on the surface. FIG. 3 is a photograph of such designs slightly appearing on the surface. It was noted that the surface of the film on the heated side was extremely smooth as shown in FIG. 4, while that side which was being cooled showed web designs remarkably. The surface roughness shown in FIG. 2 was 0.1 to 9 microns.

The above illustration has been given only about the cooling effect on the surface of the film opposite to the infrared ray heater, but as a matter of course the other side too will have the same web designs.

With the purpose to examine the web designs on the film, the film was put to observation by means of a phase difference microscope mounted with glycerine, but no unusual design was recognized as in FIG. 6. This showed that change was made only on the surface structure as above mentioned and orientation was made uniformly in the interior part of the film.

FIG. 5 is a microphotographic picture of a biaxially oriented film obtained by aluminium shadowing. The non-oriented film was the same in condition as the film surface in FIG. 4.

Polypropylene film obtained by uniform heating and orientation by means of hot blow only has surface construction similar to that shown in the photograph of FIG. 4.

FIG. 7 is a photograph in which a polypropylene film has been stretched in one direction only with the surface being heated by an infrared ray heater and the backside cooled by contact with rollers. In this example there have been observed fine stripes in the stretching direction but found no extraordinary web structure of this invention. Usually the film of this construction does not insure a desirable smoothness.

Another experiment was made for obtaining temperature differences between the film surface and interior part of the film in order to acquire a complete effect of this invention. A polypropylene film preliminarily stretched in the longitudinal direction was heated by an infrared ray heater on one side by means of the improved tenter disclosed in Japanese patent application No. 23,256/1961. The construction of the improved tenter is illustrated in FIGS. 12–14 wherein FIGURE 12 shows a plan view, FIGURE 13 shows a side elevational view and FIGURE 14 shows the sectional view taken along line 14—14 in FIGURE 12. In these figures, 11 generally designates the improved tenter means; 12 and 12', rails; 13 and 13', chains with catching member; 14 and 14', 15 and 15', sprockets and each one being driven or followed; 16 and 16', reflecting mirrors consisted of the arc surface of an infrared heater; 17, a reflecting plate; 18 and 18', air feeding ducts; 19 and 19', holes for injecting heated air from the ducts 18 and 18'; 20 and 20', heaters; 21 and 21', fans; 22 and 22', absorbing ports; 23, an infrared heater; and f, the film to be stretched. The reflecting mirrors 16 and 16' and the heater 23 are so arranged that they are on the opposite sides with respect to film f as shown in FIGURE 14. During the experiment, a proper adjustment was made in the electric power of the infrared heater to impart an orientation characteristic to the film while circuating a hot blow of various temperatures in the whole orientation chamber which maintained the orientation temperature uniform. (Temperature in the interior part of film.)

Under these conditions, the temperature of the hot blow to be injected on the film or the temperature of the roller was lowered by 10° C. or more than said orientation temperature, and it was discovered that the desired specific structure actually appeared on the surface of the film.

The cooling temperature for the film is particularly important in the production of specific surface constructions for the film, the values of which are variable according to thickness, orientation temperature, orientation speed, cooling system and other requirements, which must be determined for individual films by experiment. However, for polypropylene film the best application was made at a temperature difference of over 10° C.

Another outstanding feature of this invention is to acquire a peculiar surface construction when right angle orientation is made on a preliminarily oriented film by the special heating method described previously. This fact is clearly shown in the accompanying photograph of FIG. 7.

The same specific surface construction of this invention is similarly obtained in the orientation of film by the inflation system, and the invention is not merely limited to the tenter system as mentioned above. In the inflation systems it is preferable to choose the particular location on the film receiving the most intense orientation.

The following are results obtained for the coefficient of friction from oriented and non-oriented polypropylene films.

TABLE 1

| Sample No. | Orientation | Drawing No. | Coefficient of friction |
|---|---|---|---|
| 1 | Non-oriented | 5 | More than 2.0. |
| 2 | Uniaxial | 7 | Abt. 1.6. |
| 3 | Biaxial | 6 | 1.5. |
| 4 | ...do... | 1, 2, 3 | Abt. 0.4. |

The Table 1 shows that the coefficient of friction has been higher than 2.0 for non-oriented film, which is worse in quality and not workable by ordinary cellophane finishing devices. In the biaxially or uniaxially oriented films other than this invention, the value has been reduced probably because rigidity has increased owing to the effect of orientation. The film of this invention, however, has shown a much lower value for coefficient of friction which results in its availability for finishing by an ordinary cellophane finishing apparatus.

The results gained from the process of this invention are illustrated in the following examples.

*Example 1*

Polypropylene having a 2.5 intrinsic viscosity in tetralin solution at 135° C. and 95% of residue at n-heptane extraction was melted at 280° C., extruded and thereafter cooled to form a sheet of 1.0 mm. The product was stretched initially in the longitudinal direction about 4.5 times at 135° C. Then the improved tenter of patent application No. 23,256/1961 and the infrared ray heater were applied to orient the film in the transverse direction so that the orientation temperature $T_1$ was set always at 155° C. A hot blow was then circulated in the whole orientation chamber varying the hot blow temperature $T_2$ to several temperatures. The tests have thus been made on the coefficient of friction, microscopic data, surface roughness, appearance, and antiblocking characteristics. Measurement on the coefficient of friction was made in the following way.

By employment of a device as illustrated in FIG. 8 a sample piece of film cut in 175 x 45 mm. was applied on the metal roller 1 of 160 mm. in diameter. Separately a sample piece of same material cut in 280 x 35 mm. was prepared, both ends of which being fixed to clamps 2 and 3 and hung as shown in FIG. 8.

A sample piece of film is sometimes different in quality on the upper and lower sides, therefore it is desirable to arrange similar quality in surfaces under test.

Calculation has thus been made to obtain (coefficient of friction), from ($T_1$) as a tension force loaded on the clamp 2 by per minute rotation of a roller 1 and ($T_2$) as a tension force between a roller 1 and a clamp 3. By the following formula, $$\frac{T_2}{T_1} = e^{\mu\theta} \quad \theta = 20$$

the value of (coefficient of friction) has been obtained. In the drawing, 4 is a tension force detecting part, 5 a pulley, and 6 a weight (20 g.).

A microscopic observation in employment of a phase contrast microscope was carried out on three kinds of test pieces, namely, dry mounting, one side glycerin mounting and both sides glycerin mounting. Then pictures were taken by a microscope of 200 times and comparison was made on the results obtained. When both surfaces were mounted, the surface construction disappeared and when one surface was mounted, surface construction of one side only disappeared. From these three kinds of photographs each surface and internal construction of the film could separately and individually be observed. The test sample for this experiment was prepared by applied aluminium shadowing.

Measurement on the surface roughness was made by the following method.

After the film surface was carbon coated in vacuum and the surface was observed by the method mentioned above, then the film was cut by a microtome on the parts of webbed surface along the lines crossing generally perpendicularly. The cross section of a piece was taken by microphotograph. Special care was taken on the controlling iris of the condenser and mounting conditions, by which best surface roughness was obtained by a photograph of 600 magnifications. FIG. 9 shows the example in which 6 mm. actual length is equivalent to 1 micron. Surface roughness was considerably uneven, but a mean value was taken as average in unit of micron. In the drawing $a$ shows a real value and $b$ a unit value of 1 micron. Unevenness due to foreign matter was not taken into account.

Such definition was possible as the surface roughness was apparent and other parts were relatively flat on the surface, although some other wording might have been employed to express the condition on the surface roughness. Appearance was observed with surface gloss and hair and other factors taken into consideration. Further antiblocking characteristics were observed according to ASTM D–884–48 and classified into the following four categories.

N.B.—The film was inclined and divided into two parts and slipped.
V.SL.B.—Rubbed from upward and divided into two parts and slipped.
SL.B.—Pulled and divided without injuring film at all.
B.—Pulled and divided but injuring film.

B. Pulled and divided but injuring film.

As often discussed in A. J. G. Allan. J. Colloid Sci., 14. 206–221 (1959) and others, anti-blocking characteristics are affected by elapse of time after the film is manufactured. After making preparatory experiment, however, almost no change by the hour was recognized.

Measurement was made after leaving the material for one and a half months in the same condition after membrane was formed.

Such changes in characteristics are illustrated hereafter by referring to variation of hot blow temperatures $T_2$. Assuming that $T_2$ is each 100, 110, 120, 130, 140, 150 and 155° C., variations in the coefficient of friction are as indicated in FIG. 10. The variation in surface roughness is also given in FIG. 11. The blocking characteristics are then as follows:

TABLE 2.—VARIATIONS IN BLOCKING CHARACTERISTICS

| $T_2$: | Blocking characteristics |
|---|---|
| 100° C. | N.B. |
| 110° C. | V.SL.B. |
| 120° C. | V.SL.B. |
| 130° C. | V.SL.B. |
| 140° C. | V.SL.B. |
| 150° C. | SL.B. |
| 155° C. | SL.B. |

The coefficient of friction showed 0.68 at $T_2$ 140° C. and was considered big, but the blocking characteristics were rather good. Therefore it can be said that the effect has been apparently brought about from the case of $T_1$ 155° C., $T_2$ 140° C. Below is given Table 3 concerning the results in appearance.

TABLE 3.—VARIATIONS IN APPEARANCE

| $T_2$: | Appearance |
|---|---|
| 100° C. | Surface haze was not good and transparency was a little inferior. Practically it could be used for packing and other purposes. |
| 110–155° C. | Both surface gloss and transparency were good. |

*Example 2*

Polypropylene having a 2.5 intrinsic viscosity in tetralin solution at 135° C. and 95% of residue at n-heptane extraction was melted at 280° C., extracted from a cylindrical slit, cooled and formed into a cylindrical sheet of 0.6 mm. This was put into an air current of 100° C. hot blow for preheating. As the sheet approached 100° C. and having 100° C. hot blow flowing slightly along the cylindrical surfaces, the sheet was heated abruptly at about 150–160° C. by an infrared ray heater and simultaneously stretched. The obtained film had a coefficient of friction, 0.41, and the haze (ASTM D–1003–52) was 2.1%. On both faces of the film there occurred web designs as shown in FIG. 1 or FIG. 3.

*Example 3*

Similar material was used as in Examples 1 and 2 and stretched at the same temperatures and to the same magnifications. The hot blow was not circulated in the tenter of Example 1, but the film was heated from above by an infrared ray heater. Temperature in the orientation chamber was about 50° C. The obtained film was put to observation by a microscope. There was seen webbed construction solely on the backside of the film (on the side where infrared ray heater does not exist). The top surface was smooth as in FIG. 4. Haze degree was 1.0%, coefficient of friction was 0.43 between two back sides and 0.55 between an upper face and a back face.

*Example 4*

Polyethylene terephthalate having a 0.64 intrinsic viscosity in orthochlorphenol solution at 280° C. was melted, extruded and cooled to form a sheet of about 0.15 mm. thickness, stretched 3.5 times in longitudinal direction at 85° C., further stretched 3.6 times in transversal direction at about 110° C. and heat treated at 200° C. In the tenter the film was heated uniformly on the whole surface by an infrared ray heater from above and a hot blow of about 70° C. was circulated. The obtained film showed the desired specific construction on both faces with a 0.55 coefficient of friction and a 0.8% haze degree.

What we claim is:

1. In the process for manufacturing thermoplastic film which has been stretched uniaxially in one direction, the improvement in further stretching the film in the perpendicular direction to said one direction which comprises radiantly heating the interior of said film to the orientation temperature while maintaining at least one surface of the film at a temperature less than the orientation temperature of said film.

2. The process in accordance with claim 1 wherein the thermoplastic film surface formed has web designs with a roughness within the range between the minimum 0.03 and the maximum 5 microns.

3. A process for forming microscopic web formations on the surface of a thermoplastic film which comprises uniaxially orienting said film and then maintaining at least one surface of the film at a temperature below the orientation temperature of the film while the film is being oriented in a direction perpendicular to the said uniaxial direction.

4. A process for forming microscopic web formations on the surface of a thermoplastic film which comprises transversely orienting said film while the interior of the film is heated to the orientation temperature of the film and at least one surface is maintained at a temperature below said orientation temperature.

5. The process in accordance with claim 4 wherein said surface is maintained at a temperature of about 10° C. to 45° C. below the orientation temperature of the film.

References Cited by the Examiner
UNITED STATES PATENTS

| | | | |
|---|---|---|---|
| 2,896,262 | 7/1959 | Herrmann | 264—291 |
| 2,976,567 | 3/1961 | Jones et al. | 264—210 |
| 3,108,851 | 10/1963 | Hofer et al. | 264—289 |
| 3,141,912 | 7/1964 | Goldman et al. | 264—290 |

FOREIGN PATENTS 230,105　4/1959　Australia.

ALEXANDER H. BRODMERKEL, *Primary Examiner.*

F. S. WHISENHUNT, Jr., D. J. ARNOLD,
*Assistant Examiners.*